May 26, 1970 D. A. KASSNER 3,514,730
COOLING SPACER STRIP FOR SUPERCONDUCTING MAGNETS
Filed March 27, 1968 2 Sheets-Sheet 1

INVENTOR.
BY DAVID A. KASSNER

May 26, 1970     D. A. KASSNER     3,514,730

COOLING SPACER STRIP FOR SUPERCONDUCTING MAGNETS

Filed March 27, 1968     2 Sheets-Sheet 2

INVENTOR.
DAVID A. KASSNER

United States Patent Office 3,514,730
Patented May 26, 1970

3,514,730
COOLING SPACER STRIP FOR SUPER-CONDUCTING MAGNETS
David A. Kassner, Patchogue, N.Y., assignor to the United States of America as represented by the United States Atomic Energy Commission
Filed Mar. 27, 1968, Ser. No. 716,496
Int. Cl. H01f 7/22
U.S. Cl. 335—216      2 Claims

ABSTRACT OF THE DISCLOSURE

Cooling spacer strip for receiving a cooling fluid for circulating it in a uniformly fine network of small, rectangular cross-section, mutually perpendicular streams that communicate with each other in a helically wound maze having transverse openings for contacting the fluid with the face of a helically wound, edge cooled superconductor strip. The cooling spacer strip also provides an easily fabricated, helically wound, uniformly fine, grid shaped matrix for supporting the superconductor strip in a large bore, high-field, superconducting magnet.

BACKGROUND OF THE INVENTION

In the field of nuclear research a need exists for a cooling spacer strip for high field, large bore, superconducting magnets for confining and deflecting nuclear particles. As described in U.S. Pat. 3,358,144, the size of these magnets has become larger and larger, and these increased size magnets have been difficult economically to support and cool. For example, a fourteen foot magnet coil for deflecting particles in a bubble chamber requires support against forces resulting from a 20 kilogauss to 30 kilogauss field around a chamber volume of 47,000 liters of supercooled fluid. It is advantageous, therefore, to provide an accurate, uniformly fine matrix for the large forces involved and for providing adequate face cooling of each winding of the magnet coil. It is additionally advantageous to provide a cooling spacer strip that is inexpensive, reliable and easy to fabricate by forming and punching, and that is easy to assemble with helically wound superconductor, insulator and supporting strips.

It is the object of this invention, therefore, to provide an economical and practical superconducting magnet by providing a cooling spacer strip forming both a strong, supporting, grid shaped matrix, and an efficient, crisscrossed, cooling channel network that is helically wound with a stabilized superconductor strip for the proper location therewith;

It is a further object to provide means for efficiently circulating cooling fluid past the face of each turn of a helically wound superconducting strip;

It is a further object to provide a superconducting magnet coil having a superconducting strip with efficient face cooling.

SUMMARY OF THE INVENTION

The invention described herein was made in the course of, or under a contract with the United States Atomic Energy Commission.

The foregoing objects are achieved by providing a spacer strip that is easily, accurately and rapidly fabricated and assembled with a helically wound superconductor strip to form a fine helically wound grid forming a labyrinth of small, solid support areas and a helically wound, overlapping, crisscrossed cooling channel network for efficiently circulating cooling fluid past the face of each turn of the helically wound superconductor strip. More particularly in one embodiment, this invention provides a cooling spacer strip for receiving a cooling fluid and circulating it in a network of small rectangular cross-section streams that inter-communicate at right angles along the face of the superconducting strip, while providing uniformly fine supporting grid shaped matrix between the helically wound superconductor turns. Advantageously the cooling spacer strip is a copper cooling spacer strip adjacent reinforcing and insulating strips and forms a grid of uniform cross-section, rectangular, small, support pads and cooling channels with spaced apart, longitudinal grooves, and spaced-apart transverse rectangular openings each providing a through bore. With the proper selection of components and construction, as described in more detail hereinafter, the desired magnet having the required support and efficient network of cooling channels provided.

The above and further novel features and advantages of this invention will appear more fully from the following detailed description when the same is read in connection with the accompanying drawings. It is expressly understood, however, that the drawings are not intended as a definition of the invention but are for the purpose of illustration only.

DESCRIPTION OF THE PREFERRED EMBODIMENT

Figure 1:
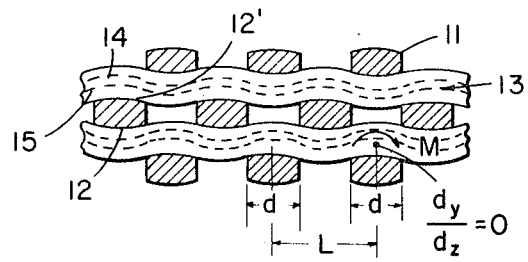
FIG. 1 is a partial schematic view of a crisscrossed lattice of copper spacer strips and strips having superconductor wires embedded in a ribbon shaped copper sheath.

The cooling spacer strip of this invention is useful in large bore, air-core, split-pair, superconducting, high field, magnets for large bubble chambers. In this regard, the utility of large bubble chambers is greatly enhanced by efficiently providing for a large magnetic field whose intensity is sufficient for precise momentum measurements and magnetic trapping of particles over an appreciable range of momentum. Accordingly, the cooling spacer strip of this invention is adapted to be used in magnets for producing fields of up to 20–30 kg. or more. As will be understood in more detail hereinafter, however, cooling spacer strip of this invention is useful in any large field, large bore magnet requiring a practical and efficient system for cooling and supporting a helically wound superconductor strip.

It is known that the construction and safe, reliable operation of high field superconducting magnets requires a practical and efficient system for superconductor stabilization. One form of stabilization involves parallel superconducting wires having appropriate amounts of normal conducting copper in good thermal and electrical contact with the superconductor. One such system is illustrated by composite conductor (c) as shown on page 120 of the March 1967 issue of Scientific American. The invention hereinafter described utilizes a composite conductor strip of the type described in this reference. As will be understood in more detail hereinafter, enough normal conductor and sufficient cooling are provided in accordance with this invention so that during transient instabilities such as the "flux jumps" described in the above-cited reference on page 118, the magnet current can transfer to and be carried by the normal resistance copper without the temperature at the superconductor rising above that at which it makes the transition from the superconducting to the normal resistive state. The amount of this normal conductor also is advantageously sufficient to prevent the magnet coils from going suddenly normal if the current in the superconductors is increased above that which they carry in the magnetic field at the superconductors. To this end, in one embodiment, the superconductor strip contains parallel path Nb-Ti wire metallurgically bonded into O.F.H.C. copper. Advantageously, this strip measures 2 inches wide by .080 inch thick and has a current carrying capacity of about 4000 amperes under the conditions existing in the respective coils made therefrom. In accordance with this invention, a conductor strip like the one described above is coiled with a separate copper supporting and cooling strip forming both a fine grid shaped supporting matrix and a uniform crisscrossed network of cooling channels that provide effective stream splitting and interconnections as described in more detail hereinafter. A detailed discussion of the elements, operation and environmental features of this invention are found in report BNL 10700, which was released for publication by the Brookhaven National Laboratory after about May 24, 1967.

In order to explain how the desired cooling and supporting matrix are provided at the same time by the cooling spacer strip 11 of this invention, reference is made to FIG. 1. This figure illustrates a lattice of rectangular cross-section strips having flat faces 12. One strip, comprises superconductor strip 13 having a copper sheath 14 around superconductor wires 15. The other strip is a cooling spacer strip 11 having a major face 12 and an opposite parallel major face 12' arranged between the conductors 13. In this regard it will be understood that superconductor strip 13 has a uniform rectangular cross-section and cooling spacer strip 11 has two parallel major face widths and two parallel minor or edge widths corresponding to like widths in superconductor strip 13.

Figure 2:
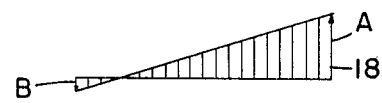
FIG. 2 is a graphic illustration of the variation of radial force across the width of a coil made with the lattice of FIG. 1.
Figure 2:
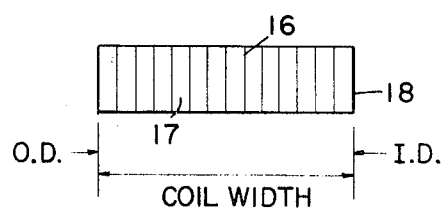

Support requirements of the cooling spacer strip 11 result from a detailed analysis of the force transfer from one superconductor strip 13 to another. As a result of the magnetic field distribution, the superconductor strip 13 that forms turn 16 that is innermost in the coil 17 made therefrom is subjected to a maximum force A outward, as shown in FIG. 2, which is a force profile across the coil 17. This force reduces to zero near the outermost turn 16 around bore 18 and finally results in a small force B inward on the outermost turns 16 around bore 18. Because of this force distribution, the cooling spacer strip 11 of this invention is required to transfer forces from one turn 16 to the next so that the result will be an essentially uniform force across the width of the coil 17.

As a practical matter, it is impossible to provide support areas of adjacent cooling spacer strips 11 located directly in line and, therefore, at some locations in the coil 17, the support area of one cooling spacer 11 must be located between the support area of an adjacent cooling spacer strip 11. Essentially, this configuration results in the superconductor strip 13 acting as a continuous beam with a central load between supports. Similarly, this invention takes a uniform grid and produces therefrom a fine substantially intermittently offset and compensated support system approximating such a continuous beam in combination with a balanced, interconnected cooling channel system.

If the circumferential width of the support area is made equal to $l/2$, where $l$ is the circumferential distance between centerlines of the support areas, resulting in 50% support circumferentially, the maximum bending moment, and thus the maximum bending stress, varies as the square of the distance between centerlines of the support areas. For a value of $l=\frac{1}{4}$ inch, this bending stress in a 7' coil, for example, is about 1500 p.s.i. To minimize the contribution to the total stress in the superconductor strip 13 from this consideration, it is imperative to limit the distance between the support areas. Also, the support areas should be rigid in the radial direction, since any deflections result in non-uniform force distribution across the coil 17.

Figure 4:
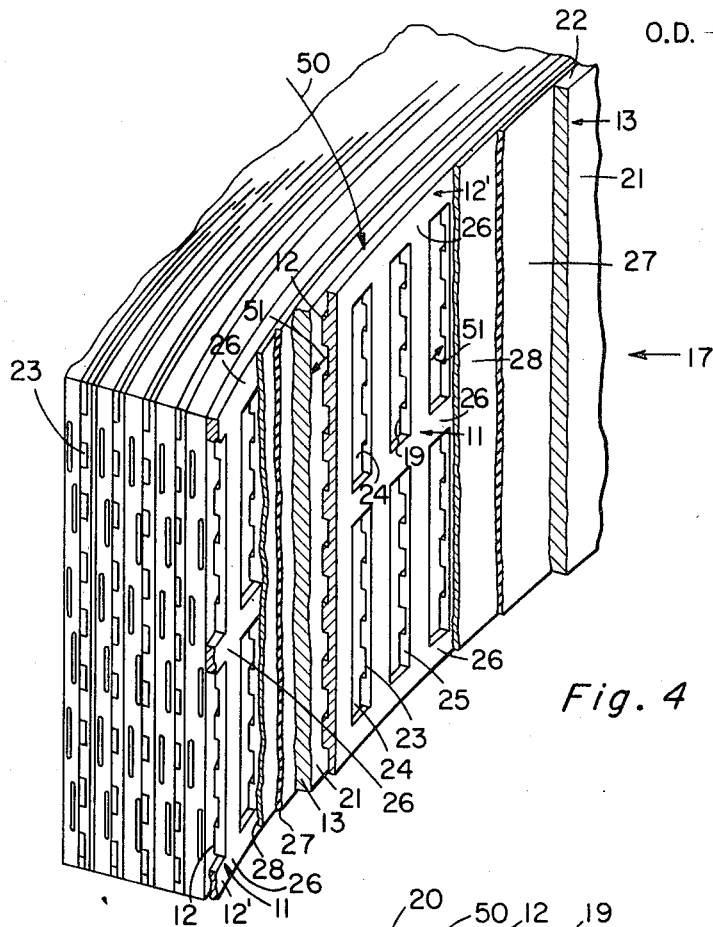
FIG. 4 is a partial three-dimensional view of a practical embodiment of a magnet coil made with the spacer strip of FIG. 3.
Figure 3:
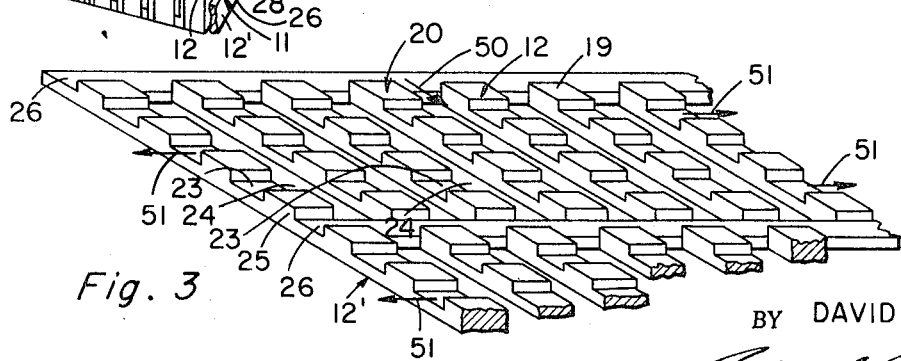
FIG. 3 is a partial three-dimensional view of the cooling spacer strip of this invention.

The result of the support requirements, therefore, requires the cooling spacer strip 11 to consist of small, uniform, rectangular cross-section solid, support areas 19 located on a fine grid 20, as shown in FIG. 3. Also, the grid 20 of cooling spacer strip 11 should provide for cooling the face 21 of a superconductor strip 13 having cooling at its edges 22, as shown in FIG. 4. Additionally, the cooling spacer strip 11 should be inexpensive to fabricate since 40,000 feet are required in a 7' diameter coil 17 (120,000 feet for a 14' diameter coil 17) and should be produced using standard mechanical forming and punching machines and techniques so that the expense and time involved in developing special machinery can be avoided; and it should have the same coefficient of thermal expansion as the superconductor strip 13.

From FIGS. 3 and 4, which illustrate the details of a cooling spacer strip 11 that satisfies all these requirements, it will be seen that fabrication of cooling spacer strip 11 involves standard tools and techniques. The first step mechancially forms eight equally spaced grooves 23 that are .037 inch deep and ⅛ inch wide in a flat face 12 of a uniform rectangular cross-section .057 inch thick by 2 inch wide cooling spacer strip 11. These grooves 23, are advantageously milled, but they can alternately be formed by rolling. In the second step, sections of copper ⅛ inch wide and ¼ inch apart are punched out through face 12 of the strip 11 to leave openings 24 transverse to the grooves 23, and forming small, solid, support areas 19 located on a fine grid 20 with uniform thickness rectangular bumps or pads 25 that are .057 inch high, ⅛ inch on a side, and disposed between a perforated grid iron shaped face 12 and an opposite, flat, unwaffled face 12' of strip 11 having openings whose centers are ¼ inch apart. Also, these pads 25 are carried by three parallel, continuous strips 26 that are .020 inch thick by ⅛ inch wide, which remain after the punching step. As will be understood in more detail hereinafter, the coolant, for example, a stream 50 of liquid helium 52, is split up into a plurality of smaller streams 51 by flowing through the longitudinal grooves 23 and transverse openings 24 formed normally to each other between the pads 25 when the cooling spacer strip 11 is sandwiched inside the coils of a spirally wound stabilized superconductor strip 13. This stream splitting system results in about 75% of the face area of superconductor strip 13 being exposed to the helium. Advantageously, the stabilized superconductor strip 13 and cooling spacer strip 11 are spirally wound with an insulation strip 27 and a reinforcing strip 28 to form coils 17 that can be assembled into double layered pancakes 29 adapted to form a plurality of interconnected modules, as will be understood in more detail hereinafter.

In the practical embodiment of a coil 17, partially shown in FIG. 4 for ease of explanation, the various components, comprise turn to turn electrical insulation in the coil windings provided by a .005 inch thick polyester or Mylar insulation strip 27, which is backed with suitable adhesive, such as epoxy, and wound adjacent the superconductor strip 13. To aid in supporting the stresses in the pancake winding turns 16, a reinforcing strip 28 made of standard stainless steel .012 inch thick is also wound with the conductor 13 in each pancake 29. Advantageously, the insulation strip 27 is pre-applied to and carried by support strip 28.

Figure 5:
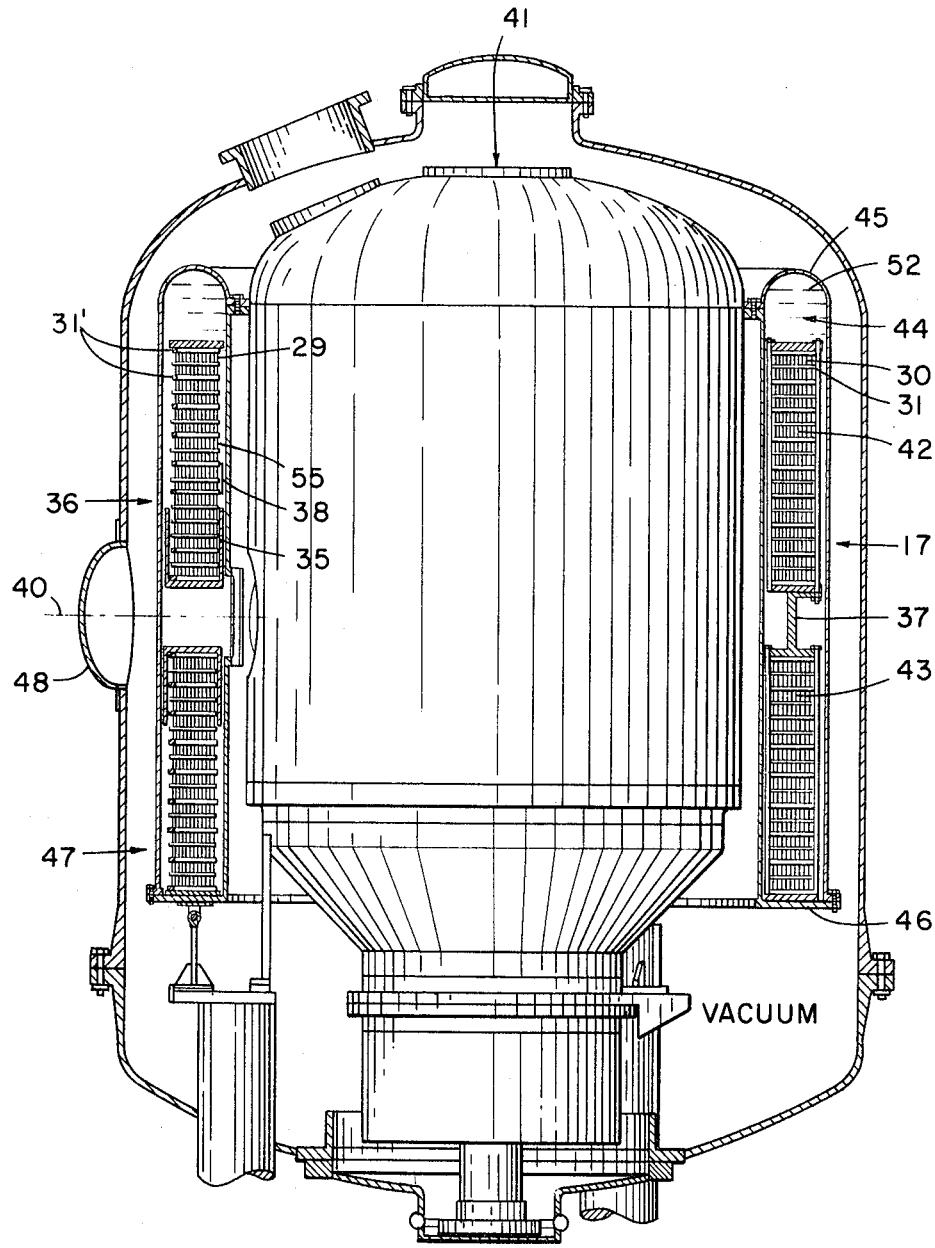
FIG. 5. is a partial cross-section of a bubble chamber incorporating the system of FIG. 4.

Advantageously, as shown in FIG. 5, two co-axial layers 30 of helically wound laminations of cooling spacer strip 11, superconducting strip 13, insulating strip 27 and reinforcing strip 28 form each pancake 29. These layers are supported and insulated from each other by parallel, horizontally located and perforated ⅛ inch thick plastic cooling spacers 31 that are slotted to provide for radial and axial flow of the liquid helium coolant in first large streams 50 for splitting by cooling spacer strip 11 into small streams 51. In a similar fashion, neighboring pancakes 29 are supported and insulated by additional spacers 31' that are ⅝ inch thick. These spacers 31 and 31' are fabricated from a fiberglass based phenolic that has a coefficient of expansion similar to copper, and are located in position by slots that are guided on tie rods connecting coil face plates 35 to form suitable modules 36 supported by bridge structure 37.

Also, radial clamps and end clamps 38, which are environmental to this invention, are provided. The main function of the radial clamps is to secure the pancakes 29 when they are removed from the winding fixture prior to installation in the coil modules 36. Lifting the pancakes 29 is accomplished by a fixture bolted to the clamps The clamps are fabricated from stainless steel, having top and bottom plates, an inside plate contoured to match the inside coil radius and a front plate. The front plate contains two set screws that act against two pressure plates providing a radial clamping force. The end clamps 38 constrain the conductor terminating ends of individual pancakes 29 and are provided with suitable low resistance connections, internal cross-over assemblies and internal splice joints for the various conductor ends in each pancake. Also, suitable inter-pancake electrical connectors are provided, comprising phosphor bronze units shaped on one side to match the outer coil radius, and on the other side it has an entrance ramp. All of these components are suitably cooled, since they are located in dewar 44 and exposed to the liquid (cold) helium 52 by the arrangement of this invention.

In operation, the coil 17 provides a large hollow cylindrical bore 55 for deflecting and confining nuclear particles introduced through window 48 along axis 40 at right angles to the axis of the bore 55 of the magnet coil 17 so that precise momentum measurements and magnetic trapping of the particles occurs over an appreciable range of momentum in a symmetrical bubble chamber 41 for photographing the bubble tracks produced by the particles in the chamber. To this end, the components of the coil assembly 47 are energized in series to avoid heat leaks through a plurality of leads and the single input and output leads are energized from a suitable source of direct current, or with a flux pump, to produce a field up to 20–30 kg. or more in the bore 55 inside two spaced magnet halves 42 and 43 separated by bridge 37. Meanwhile, insulation strip 27 provides turn to turn insulation; non-magnetic, flux transmitting reinforcing strip 28 reinforces the superconductor strip 13 and provides spaced apart, adjacent, flux filling paths on a helix; and cooling spacer strip 11, which is helically adjacently coiled with the reinforcing and superconductor strips 28 and 13, forms a grid shaped matrix of small, solid, curved, support areas 19 between the superconductor strip 13 and cooling spacer strip 11, and an opening filled labyrinth of pads 25 of uniform thickness. This structure provides an opening filled maze of uniformly rectangular cross-section, streamlined, mutually perpendicular, respectively milled and punched grooves 23 and rectangular openings 24 transverse to the grooves for providing a compact, streamlined, continuously coursing, normally interconnecting, network of cooling fluid channels for contacting the liquid helium 52 with each coil turn 16 at the face 21 thereof. In this connection, the liquid helium 52 upon filling into dewar 44 is free to move in a continuous stream or course to contact the face of any turn of coil 17. Likewise, after filling fluid into dewar 44, bubbles formed therein are free to escape and are removed quickly from the face of any and every turn of coil 17 without being trapped in any part of coil 17.

Advantageously, the coil 17, the modules 36, and the upper and lower magnet halves 42 and 43 are stacked in a single dewar 44 as shown in FIG. 5. The coolant, for example, liquid helium 52, moves into one end, for example, the top 45 of the dewar, moves in a stream 50 into the matrix provided by grid 20, moves in small streams 51 laterally around the coils 17 through grooves 23, moves axially in coil 17 through openings 24, and radially between the coils 17 to cool the faces 21 and edges 22 of each turn 16 of superconductor strip 13 in coil 17. For convenience, the fluid 52 may be circulated into top 45 and out the bottom 46 of dewar 44.

The coil parameters in one embodiment are:

16 pancakes 29
32 layers 30 in each pancake 29
45 turns 16 per layer 30
1440 turns 16
4000 amperes coil current
$5.76 \times 10^6$ ampere turns
20–30 +kg. central and maximum fields
13.25 inches between split pairs 42 and 43
94.75″ coil 17 inside diameter
108.75″ coil 17 outside diameter
1250 feet conductor length per layer 30
40,000 feet total conductor 13 length
2000 pounds weight per pancake 29
32,000 pounds total weight assembly 47
10,000 liters of liquid helium 52

This invention has the advantage of providing a practical, effective and inexpensive cooling spacer strip for large bore, helically wound, series connected, superconductor coils. Moreover, the cooling spacer strip of this invention forms a helically wound grid shaped matrix having solid support areas, and uniform thickness pads that provide a helically wound network of grooves and rectangular openings transverse to the grooves for cooling the faces of the superconductor strip when helically coiled therewith thereby to provide a compact, strong, efficiently cooled, and safe, large bore, reliable magnet producing fields of up to 30 kg. or more.

What is claimed is:

1. In a large bore, high field, magnet coil (17) having an edge cooled, face (21) forming superconductor strip (13) of copper (14) coated superconductor wire (15) helically wound in a plurality of overlapping turns (16) forming overlapping faces (21) in said magnet coil (17), the improvement, comprising a normal resistance cooling spacer strip (11) coiled between said overlapping faces (21) of said overlapping turns (16) of said superconductor strip (13) with small, solid, support areas (19) located on a fined grid (20) and forming pads (25) of curved, uniform thickness, uniform rectangular cross-section for providing longitudinal grooves (23) and rectangular openings (24) transverse to said grooves for providing normally intercommunicating channels for contacting coolant against each turn (16) of said superconductor strip (13) at the face (21) thereof.

2. The invention of claim 1 in which said cooling spacer strip (11), consists of copper that is less thick than wide having equally spaced grooves (23) uniformly deep and wide, and openings (24) uniformly wide and spaced apart forming rectangular uniformly high pads (25) whose centers are uniformly spaced apart and carried by parallel strips (26) uniformly thick and wide.

References Cited

UNITED STATES PATENTS

| | | | |
|---|---|---|---|
| 3,332,047 | 7/1967 | Borchert | 335—216 |
| 3,363,207 | 1/1968 | Brechna | 335—216 |
| 3,416,111 | 12/1968 | Bogner | 336—60 |

GEORGE HARRIS, Primary Examiner

U.S. Cl. X.R.

336—60